United States Patent
Shirasawa

(10) Patent No.: US 7,564,604 B2
(45) Date of Patent: Jul. 21, 2009

(54) COLOR SIGNAL PROCESSING AND COLOR PROFILE CREATION FOR COLOR IMAGE REPRODUCTION

(75) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1004 days.

(21) Appl. No.: 11/009,340

(22) Filed: Dec. 10, 2004

(65) Prior Publication Data
US 2005/0140997 A1    Jun. 30, 2005

(30) Foreign Application Priority Data
Dec. 11, 2003 (JP) ............................. 2003-412875

(51) Int. Cl.
G03F 3/08  (2006.01)
G06F 15/00 (2006.01)
G06K 9/00  (2006.01)

(52) U.S. Cl. .................... 358/529; 358/1.9; 382/167

(58) Field of Classification Search ............... 358/529, 358/530, 520, 523, 518, 515, 521, 525, 504, 358/1.9; 382/167, 162, 165, 166
See application file for complete search history.

(56) References Cited

U.S. PATENT DOCUMENTS

| | | | | |
|---|---|---|---|---|
| 5,315,382 | A * | 5/1994 | Tanioka ................ | 358/523 |
| 5,752,007 | A * | 5/1998 | Morrison .............. | 703/2 |
| 6,173,218 | B1 * | 1/2001 | Vian ..................... | 701/1 |
| 6,412,898 | B1 * | 7/2002 | Danzuka et al. ...... | 347/15 |
| 6,483,606 | B1 * | 11/2002 | Klassen et al. ....... | 358/1.9 |
| 6,700,795 | B1 * | 3/2004 | Jones et al. .......... | 361/784 |
| 7,206,100 | B2 * | 4/2007 | Namikata ............. | 358/3.23 |
| 7,235,898 | B1 * | 6/2007 | Jones et al. .......... | 307/9.1 |
| 7,346,370 | B2 * | 3/2008 | Spaur et al. ......... | 455/556.1 |
| 2002/0103737 | A1 * | 8/2002 | Briere .................. | 705/36 |
| 2002/0156603 | A1 * | 10/2002 | Alhadef et al. ....... | 703/2 |
| 2003/0051026 | A1 * | 3/2003 | Carter et al. ......... | 709/224 |
| 2003/0065614 | A1 * | 4/2003 | Sweeney ............... | 705/38 |
| 2004/0111188 | A1 * | 6/2004 | McClure et al. ...... | 701/1 |
| 2004/0229683 | A1 * | 11/2004 | Mothwurf et al. .... | 463/26 |

(Continued)

FOREIGN PATENT DOCUMENTS

JP    S62-91078    4/1987

(Continued)

OTHER PUBLICATIONS

Japanese Office Action for JP Appln No. JP2003-412875, Issue Date Jul. 30, 2008 (2 pages).

(Continued)

*Primary Examiner*—Madeleine A Nguyen
(74) *Attorney, Agent, or Firm*—Blakely, Sokoloff, Taylor & Zafman LLP

(57) ABSTRACT

A signal processing method for converting input color value information (Lab) represented in a uniform color space into a set of five output color levels of black, light black, and three chromatic colors (CMYKLk) is provided. A black output level (K) is determined based on the input color value information. Then, a light black output level (Lk) is determined based on the black output level and the input color value information. Output levels of the three chromatic colors (CMY) are also determined such that the determined output levels are colorimetrically consistent with the input color value information.

14 Claims, 11 Drawing Sheets

U.S. PATENT DOCUMENTS

| | | | |
|---|---|---|---|
| 2005/0004723 A1* | 1/2005 | Duggan et al. | 701/24 |
| 2005/0058149 A1* | 3/2005 | Howe | 370/428 |
| 2005/0086256 A1* | 4/2005 | Owens et al. | 707/103 R |
| 2005/0219618 A1* | 10/2005 | Shimada | 358/2.1 |

FOREIGN PATENT DOCUMENTS

| | | |
|---|---|---|
| JP | 05-292306 | 11/1993 |
| JP | 07-079355 | 3/1995 |
| JP | 10-173948 | 6/1998 |
| JP | 2001-157055 | 6/2001 |
| JP | 2001-277552 | 10/2001 |
| JP | 2002-067355 | 3/2002 |
| JP | 2003-192967 | 7/2003 |
| JP | 2003-296087 | 10/2003 |
| JP | 2003-341046 | 12/2003 |

OTHER PUBLICATIONS

Japanese Office Action for JP Appln No. JP2003-412875, Issue Date Oct. 21, 2008 (3 pages).

* cited by examiner

COLOR SIGNAL PROCESSING AND COLOR PROFILE CREATION FOR COLOR IMAGE REPRODUCTION

The present application claims priority to the corresponding Japanese Application No. 2003-412875, filed on Dec. 11, 2003, the entire contents of which are hereby incorporated by reference.

BACKGROUND OF THE INVENTION

1. Field of the Invention

The present invention generally relates to a color signal processing technique and a color profile creation technique applied to color image reproducing apparatuses, such as color facsimile machines, color printers, or color copiers. The present invention particularly relates to a technique required to convert input color image signals to chromatic signals suitable to color image output apparatuses.

2. Description of Related Art

In general, four color components, cyan (C), magenta (M), yellow (Y), and black (K), are used when reproducing color images in electrophotographic printing or inkjet recording. Black ink is used because using only three colors of yellow, magenta, and cyan cannot achieve satisfactory image reproduction, lacking sharp image contrast, due to insufficient coloration. On the other hand, input color signals are typically represented by three components of a three-dimensional color space, such as the L*a*b* color space or the L*u*v* color space independent of devices and equipment, or the RGB color space used for monitoring signals. For this reason, the color signals have to be converted from the three-dimensional color space to the four-dimensional color space when reproducing a color image. However, since there are a number of CMYK signal levels equivalent to a three-dimensional input color signal, a problem occurs.

To overcome this problem, various color separation techniques have been proposed. In color separation, a K signal is determined from the input Lab signals under prescribed conditions, and then, a set of CMYS signals calorimetrically consistent with the Lab signals are determined, using a mapping function modeling the relation between the CMYK outputs and the Lab signals.

For example, Japanese Patent No. 3360358 (Publication 1) discloses a technique for converting color value information to 4-dimensional CMYK values. In this publication, mapping conversion means is used to determine CMY output signals based on the K output level and the input color value information of the uniform color space. The K output level is varied in a stepwise manner, and a set of CMY output signals corresponding to the input color values is estimated every time the K output value is updated to determine the range (Kmax and Kmin) of the K output level. The maximum K value (Kmax) is multiplied by a coefficient to determine a definitive K output value so as not to be below the minimum level of black (Kmin). The final CMY output values are determined using the K output value, by use of the mapping conversion means. Since the mapping conversion is calorimetric conversion, the input color values are faithfully reflected in the CMYK signals.

Another publication JP 5-292306A (Publication 2) discloses a method for determining an actual ink amount. This method is similar to the above-described method, and a black adjusting coefficient is determined according to the pixel characteristics of the input image, and an actual amount of black is determined based on the maximum possible black amount and the black adjusting coefficient.

Still another publication JP 10-173948A (Publication 3) discloses a technique for realizing high-resolution color reproduction by further optimizing the color separation in accordance with the input image characteristics. In this publication, a gray histogram of the image is created to acquire analytical data including color distribution, the brightest point and the darkest point. A black version (k version) control amount is set with respect to the analytical data such that the printing stability becomes satisfactory. The k version control amount reflects the condition of k version constraint to perform color separation to CMYK values.

Meanwhile, image reproducing apparatuses using a light black (Lk) ink with a lower density than an ordinary black ink have been developed. See, for example, JP 2003-192967A (Publication 4). Such image reproducing apparatuses are advantageous in the viewpoints of:

(1) reducing metamerism under the environment using various types of light sources; (2) reducing granularity; and (3) expanding the color reproducible range.

If the method of JP Patent No. 3360358 for determining an output signal level so as to be calorimetrically consistent with the input color value is applied to an image reproducing apparatus using a light black ink, color separation becomes difficult because there are still many combinations of CMY and light black (Lk) equivalent to the input color value existing even if a black output level is determined.

A conventional color separation for light black (Lk) ink is disclosed in, for example, JP 2002-67355A (Publication 5). The input image is converted to a set of CMYK signals consistent with the coloring characteristics of the output device, after having been subjected to Log transform, k generation and masking. The CMYK signals are further subjected to gamma conversion and multi-level error spreading for quantization, and the quantized data are transformed at each of the quantization levels using pallet matrix (referred to as pallet conversion). After the pallet conversion, each pixel level is converted to three-level signals representing no ink, light ink, and dark ink. In this manner, color separation into dark and light inks is performed through pallet conversion.

Another publication JP 2001-277552A (Publication 6) proposes a technique for performing color separation using light black ink for those colors that are likely to become granular if using black ink with an ordinary brightness.

The color separation disclosed in Publication 4 (JP 2003-192967A) cannot make use of the advantages of light black. This problem is explained below.

In a color image reproducing apparatus using ordinary four colors of CMYK, granularity is generally degraded because dots become noticeable when black ink is used with respect to a highlight color image, as compared with using chromatic colors. For this reason, black ink is not used for highlight colors.

Such problems in image quality can be reduced when using light black ink because dots are less noticeable than ordinary black ink. Accordingly, color separation may be performed at a high black ratio with an increased amount of black components, by appropriately combining black and light black. If such a high black ratio color separation is realized, various effects of improving the image quality can be expected.

(1) Metamerism is reduced. Since the reflectance spectrum characteristic of black ink is flat, the color becomes stable, even if the observation light source varies, by reproducing a gray color using black and light black.

(2) Stability with respect to change in engine is improved. If a gray color is reproduced using only black and light black, the gray color is not colored even if the engine changes, and therefore, color reproduction is performed with satisfactory color balance.

(3) Ink consumption is reduced. A color reproduced by three colors (CMY) in the conventional technique is replaced by light black, accordingly, the overall ink consumption can be reduced.

In Publication 4, color is separated into light black and black at the palette converting unit, so that both ink consumption and the image quality cannot be satisfied simultaneously. This problem is explained with reference to FIG. 4. FIG. 4 is a chart showing black output levels (indicated by the solid lines) and light black output levels (indicated by the dashed lines) with respect to the white-black axis and the blue-black axis.

First, consideration is made of five color reproduction along the white-black achromatic color axis. Along the achromatic color axis, if black is used for a highlight color, granularity becomes conspicuous because of a large difference in brightness from the white background. Accordingly, in order to perform color reproduction at a high black ratio, color reproduction is performed using only light black ink on the highlight side, and black ink is jetted when the density has increased to some extent.

Next, along the blue-black axis, the density of a blue color reproduced by a combination of magenta and cyan is high. Granularity is inconspicuous even if black is applied over the blue color because the microscopic difference in brightness is small and dots are not perceptible. Accordingly, black ink can be used from the beginning.

On the other hand, from the viewpoint of ink consumption, using black, rather than light black, is advantageous. Especially in printers, the total ink consumption may exceed the upper limit when using too much light black due to constraints on the printers concerning the total amount of ink to be ejected, and consequently, the color reproducible range is narrowed. For this reason, the color separation illustrated in FIG. 4, in which black ink is used from the beginning for the blue-black line and light black is used only for reproduction of a color near black, is required. Thus, using black ink and light black ink, the color separation scheme has to be optimized in response to the input color values.

However, the color separation using palette conversion is adapted to conduct color separation into a light black component and a black component, based on a k-signal generated after multilevel error spreading. For this reason, it becomes impossible to adjust the color separation levels of black and light black according to the input color value to be reproduced. Thus, the image quality and ink consumption requirement cannot be achieved simultaneously.

Still another publication JP 2001-277552A (Publication 6) discloses an apparatus that determines light black and black taking granularity into account; however, there is no clear description about creation of a color conversion table. Inferring implementation of this technique, a pattern is determined, taking granularity and ink duty into account, for three cases, that is, CMY color reproduction, CMYLk color reproduction, and CMYK color reproduction. Under the use of light black ink for a highlight color, it is necessary to replace light black ink by black ink when the brightness decreases to a certain extent. If light black is switched suddenly to black at the threshold level of brightness, pseudo outlines appear and the image quality is degraded, and therefore, the black level and the light black level have to change continuously, as explained above with reference to FIG. 4. However, Publication 6 does not describe continuously regulated color separation at all.

SUMMARY OF THE INVENTION

Color signal processing and color profile creation method and apparatus for color image reproduction are described. In one embodiment, the color signal processing method comprises determining a black output level and a light black output level such that a color reproduced by the output color levels is calorimetrically consistent with the color value information, and that a total output level of the three chromatic colors becomes the minimum.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE PREFERRED EMBODIMENT

Figure 1:
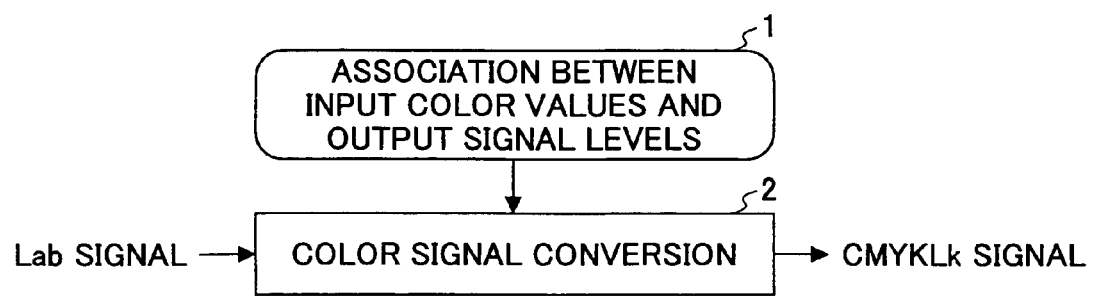
FIG. 1 is a block diagram illustrating the major structure of color signal processing according to an embodiment of the invention.

The present invention is conceived in view of the above-described problems, and an embodiment of the present invention includes a technique for outputting the optimum levels of black ink and light black ink according to the input color value.

To achieve the embodiment, in one embodiment of the invention, a color signal processing method for converting color value information represented in a uniform color space into a set of five output color levels consisting of black, light black, and three chromatic colors, is provided. In this method, a black output level and a light black output level are determined such that a color reproduced from the output color levels is colorimetrically consistent with the input color value, and that the total of the output levels of the three chromatic colors becomes the minimum.

In another embodiment of the invention, a signal processing method for converting color value information represented in a uniform color space into a set of five output color levels of black, light black, and three chromatic colors, includes the operations of:

(a) determining a black output level based on the color value information;

(b) determining a light black output level based on the black output level and the color value information; and
(c) determining output levels of the three chromatic colors such that the determined output levels are calorimetrically consistent with the color value information.

In a preferred example, this method further includes the operations of:
(d) outputting a plurality of color samples by varying the five output color levels;
(e) performing calorimetric measurement on the color samples to acquire color value information represented in the uniform color space;
(f) creating a mapping function for converting a combination of the color value information and the black output level into the light black output level; and
(g) determining the light black output level using the mapping function.

In still another embodiment of the invention, a color profile creating method for converting an input color signal into a set of output color levels of black, light black, and three chromatic colors is provided. The color profile creating method includes the operations of:
(a) converting the input color signal to a set of color values represented in a uniform color space;
(b) determining output levels of black and the three chromatic colors;
(c) determining a light black output level based on the output levels of the black and the three chromatic colors; and
(d) setting interpolation parameters according to the output levels of the five color components.

In yet another embodiment of the invention, a signal processing apparatus for converting input color value information represented in a uniform color space into a set of five output color levels of black, light black, and three chromatic colors is provided. The apparatus includes:
(a) a black level generating unit to determine a black output level based on the input color value information;
(b) a light black level generating unit to determining a light black output level based on the black output level and the input color value information; and
(c) a chromatic color level generating unit to determine output levels of the three chromatic colors so as to satisfy a maximum black condition.

In a preferred example, the apparatus further includes a comprehensive image quality evaluation unit to evaluate a reproduced image quality. In this case, the evaluation result is fed back to the black level generating unit so as to optimize the black output level.

The preferred embodiment of the present invention is now explained below in conjunction with attached drawings. In the embodiments, color values in conformity to the CIE L*a*b* color space (Lab values) are used; however, the invention is not limited to this example. For example, CIE XYZ, CIE L*a*b*, CIE L*u*v*, CIECAM, JCH and other schemes can be used. Although, in the embodiment, five color materials, cyan (C), magenta(M), yellow (Y), black (K), and light black (Lk), are used, C, M and Y inks may be replaced by other colors, such as green (G) and orange (O).

EXAMPLE 1

1. Explanation of Basic Concept

First, explanation is made of the basic idea of embodiments of the present invention. When converting a Lab input signal set to a CMYKLk output signal set, an infinite number of solutions exist because of 3-input 5-output converting system. Therefore, one possible method is determining a K-version output signal by other means, and then converting a LabK set into a CMYLk set. Since this conversion is based on a 4-input 4-output converting system, it appears that a single solution may be determined. However, in reality, multiple CMYLk signal sets exist corresponding to the same LabK signal set, and therefore, a solution cannot be determined.

For example, consideration is made of an achromatic highlight color (L=80, a=0, and b=0). Such an achromatic highlight color can be reproduced by only light black ink, or alternatively, it can be reproduced by mixture of three colors of CMY or mixture of four colors of light black and CMY. In these patterns, the output level k of black is zero, and it is understood that many points satisfying the one-to-many relation still exist in the LabK to CMYLk conversion. Accordingly, some other constraint condition has to be added in order to determine the output level Lk of light black.

In the present invention, a constraint condition that the color values are to be reproduced under the maximum black condition is added when the K-version output signal and the Lk-version output signal are determined, thereby realizing Lab to CMYKLk conversion.

In general, for a CMYK four color printer, the "maximum black" is defined as the maximum amount of black ink that can reproduce a certain set of color values. However, since black is expressed by two types of inks, namely, k-version and Lk-version, for a CMYKLk printer, the conventional definition cannot be used as it is. Accordingly, in this specification, the "maximum black" is defined as a "combination of K output level and Lk output level that renders the input color value unreproducible if the ink amount of either K or Lk is further increased".

In order to reproduce the same color level as that of a color sample printed using two of the CMY output levels together with black and light black inks, by increasing one of black ink or light black ink, the amounts of inks of CMY have to be reduced. This means that it is substantially impossible to increase the black amount.

In other words, the maximum black condition is satisfied when the input color value is reproduced by a combination of output levels that minimizes the output level of the CMY component. By performing color processing based on the maximum black condition, color separation calorimetrically consistent with the input color value can be realized, while maintaining the total ink amount to be minimum.

(Overall Structure)

FIG. 1 is a schematic diagram used to explain a color signal processing method or apparatus according to an embodiment of the invention. As illustrated in FIG. 1, colorimetry of a color chart is performed to determine the relation between color values and output signal levels in step or means 1. Then, the input color signal represented by Lab values is converted to a CMYKLk signal, while referring to the established relation, in color signal converting step or means 2.

(Association between Color Values and Output Levels)

Figure 2:
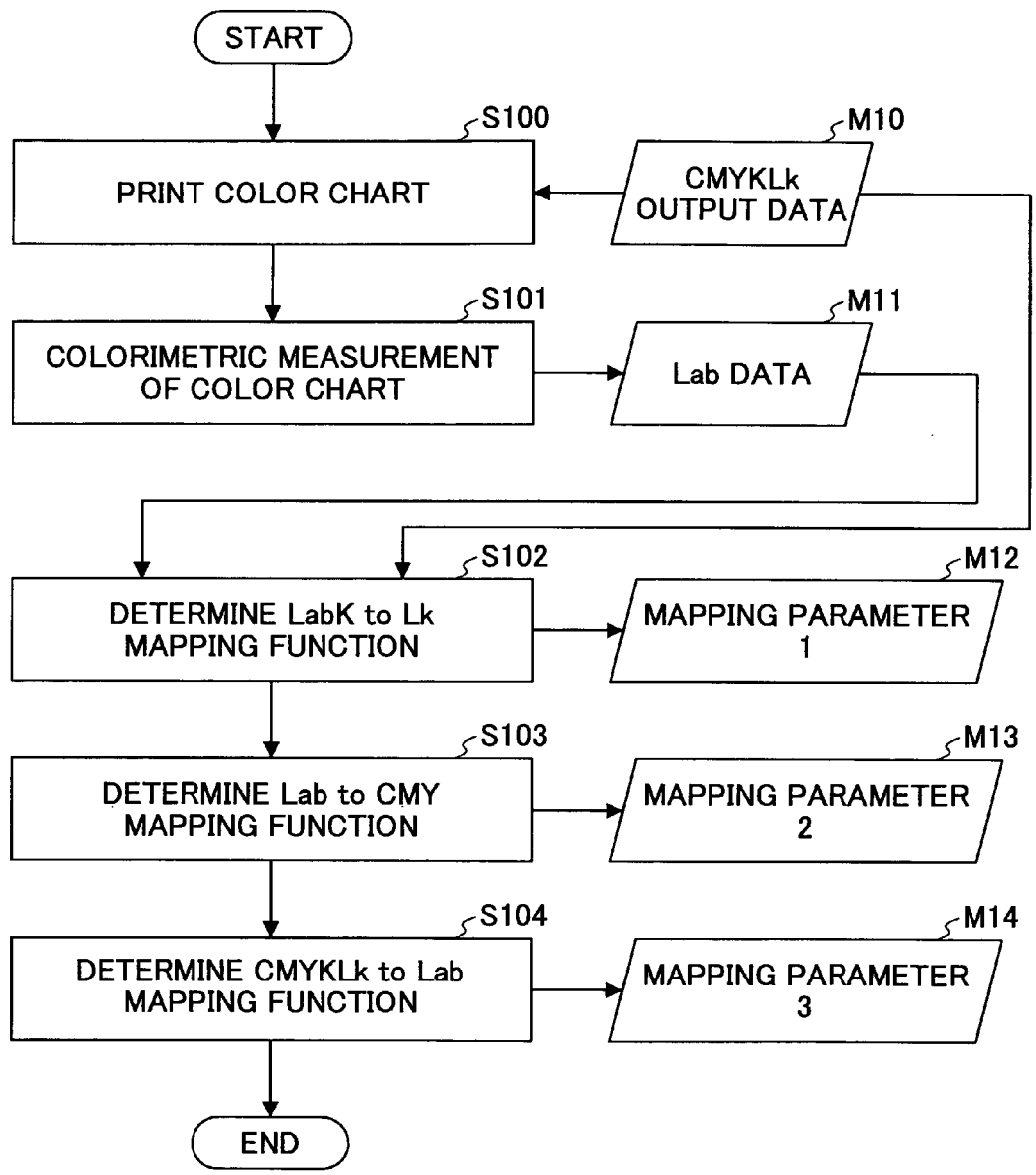
FIG. 2 is a flowchart of determination of mapping functions performed when associating the input color values with output signal levels.

FIG. 2 is a flowchart illustrating how the relation between the input color values and output signal levels is determined. First, in step S100, a color chart including many color samples is output from a printer, based on the CMYKLk output data stored in memory M10. If each of the output signals of cyan, magenta, yellow, black, and light black (CMYKLk) is output every 20%, then $6^5$ ($6^5=7776$) combinations of color samples are required. However, this embodiment aims at color conversion based on the maximum black condition, and therefore, those color samples that do not satisfy the maximum black condition become unnecessary.

Thus, the number of color samples to be printed can be reduced greatly. In order to satisfy the maximum black condition, the output level of one of the CMY colors is zero, and therefore, 3276 (6^5−125*6*6=3276) color samples are output. Although in this embodiment each color signal is output every 20%, the stepsize of the signal output may be changed for all or each of the color materials.

Next, in step S101, the 3273 color samples printed in step S100 are subjected to colorimetric measurement, and the measured color values (Lab values) are stored in memory M11. Using this colorimetric result (i.e., the Lab data) and the CMYKLk output data stored in the memory 10 in advance, an LabK to Lk mapping function, an Lab to CMY mapping function, and a CMYKLk to Lab mapping function are successively determined in steps S102, S103, and S104, respectively.

Concerning the LabK to Lk mapping function, a mapping function for associating a light black (Lk) output level with respect to the LabK signal is determined in step S102. The mapping function may be a nonlinear function realized by a known neural network (disclosed in, for example, JP 5-347703A), a known color prediction method (disclosed in, for example, JP 8-211684A), a known 4-dimensional LUT, or other suitable techniques. In this example, the mapping function is established using a neural network.

To establish a neural network, a combination of the input color value information (the Lab values) and a black output signal K of each of the 3276 printed color samples is input as a master signal, and an output signal Lk of each color sample is used as an output master signal. The input master signal and the output master signal are input again to the neural network to allow the network to learn repeatedly so as to minimize the error between the network output and the output master signal. After the neural network has learned sufficiently, the network configuration and the weighting value are stored as mapping parameters in the external storage M12 in step S102. When the mapping parameters are determined for all of the color samples, the determination of the LabK to Lk mapping function is terminated.

In this method, only the color sample data satisfying the maximum black condition are used as master data. Accordingly, if the Lab values (representing the input color signal) and the black output signal K are input to the neural network defined by the mapping parameters, a light black output signal Lk that satisfies the maximum black condition with respect to the input Lab values is acquired.

Similarly, when using a color prediction method, coefficients of a polynomial are determined by a least squares error method so as to minimize the predicted error of the light black output signal Lk that satisfies the maximum black condition.

Concerning the Lab to CMY mapping function and the CMYKLk to Lab mapping function, a mapping function for associating CMY output levels with respect to the Lab values and a mapping function for associating a Lab values with respect to the CMYKLk output signals are determined in steps S103 and S104, respectively. In step S103, the 3276 combinations of Lab values are used as input master signals, and the corresponding CMY output signals are used as output master signals. These master signals are input to the system repeatedly so as to allow the neural network to learn. After the learning, the network configuration and the weighting values are stored as mapping parameters in the external storage M13. Under the maximum black condition, there is only a single combination of CMY color materials corresponding to a set of Lab values, and therefore, a 3-input 3-output mapping function can be established.

In step S104, neural net learning is performed in a similar manner. However, the CMYKLk to Lab mapping function is used in an inverse mapping transform during the color signal conversion described below. If the conversion accuracy for those color combinations that do not satisfy the maximum black condition is significantly bad, satisfactory results may not be acquired. In such a case, neural net learning is performed using a color chart including color samples that do not satisfy the maximum black.

(Color Signal Conversion)

When all the mapping functions are determined, the input Lab color values are converted to CMYKLk output signals in the color signal conversion step or means 2, with reference to the mapping functions. The color signal conversion is explained in detail in conjunction with FIG. 3.

Figure 3:
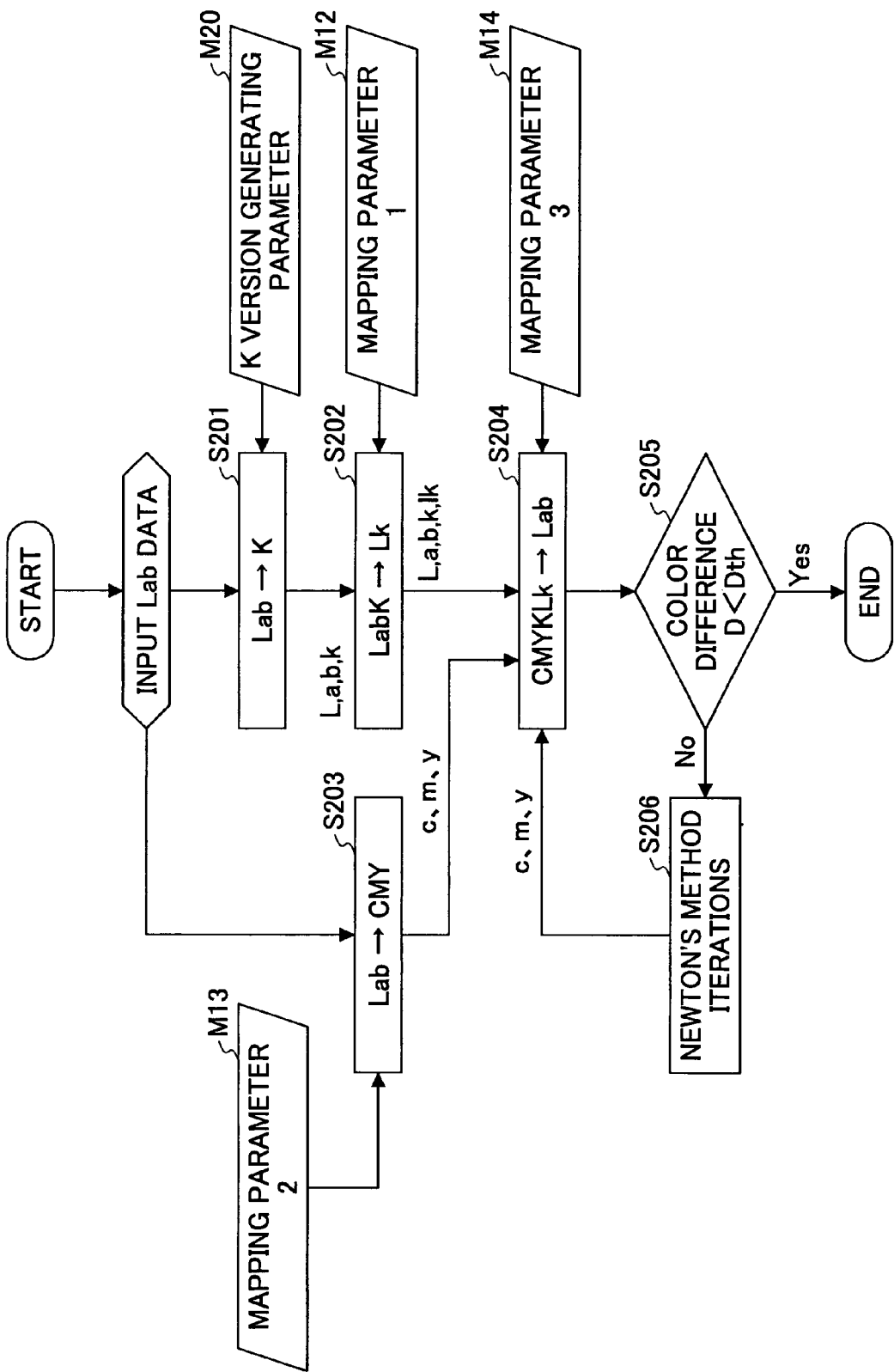
FIG. 3 is a flowchart of the color signal conversion process.
Figure 4:
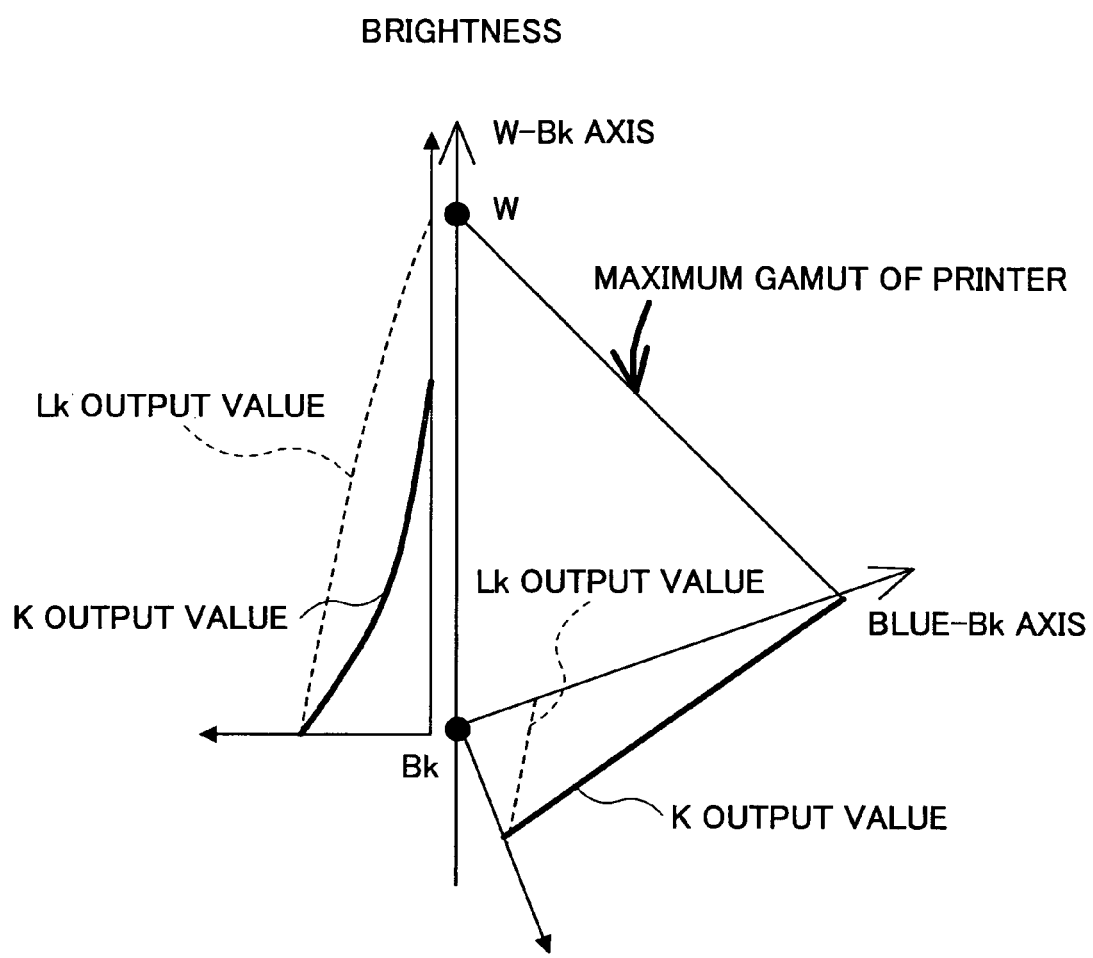
FIG. 4 is a chart used to explain an example of color separation into black and light black.
Figure 5:
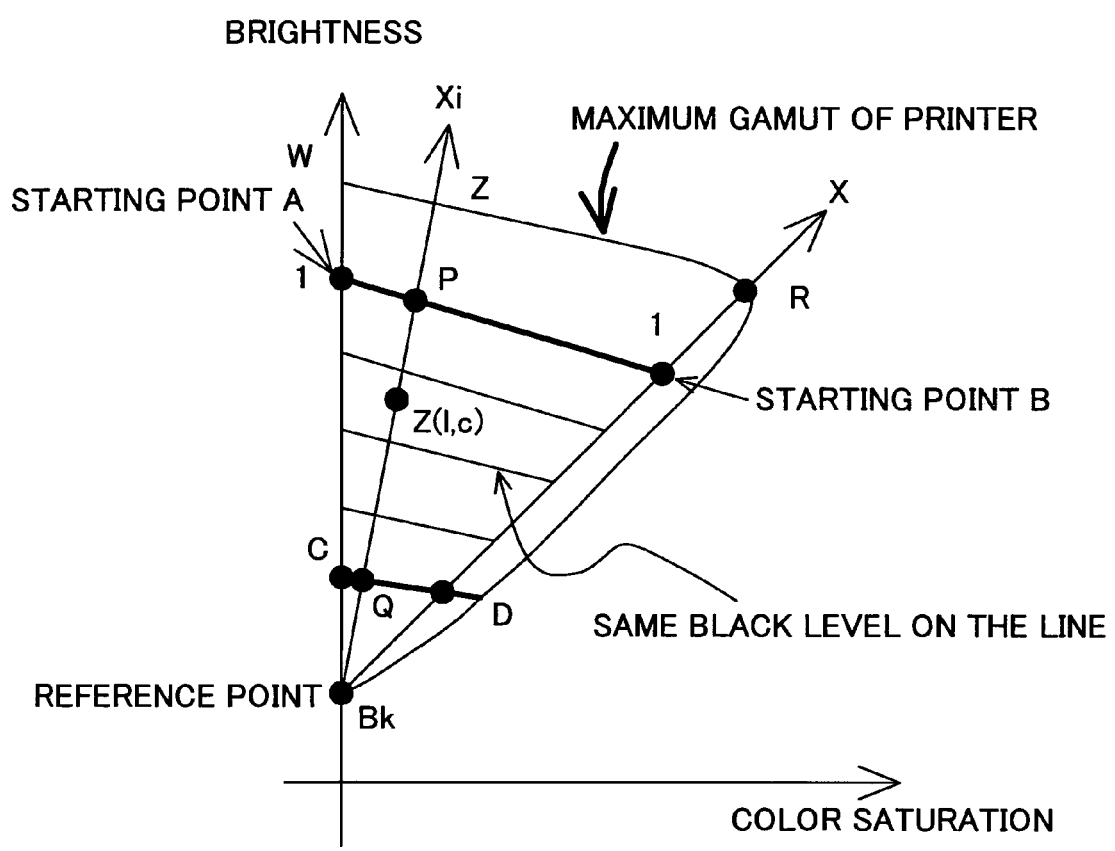
FIG. 5 is a chart used to explain black level generation.

FIG. 3 is a flowchart of the color signal converting process. When a set of Lab values is input, a black output signal K is determined according to the K-version generating parameter stored in storage M20 in step S201. An example of generating the black output signal K from the Lab values is explained with reference to FIG. 5. FIG. 5 is a chart used to explain how the black output value K is determined in the color phase of red (R). The outermost contour of the solid line represents the boundary of the color region (gamut) reproducible using all the combinations of cyan, magenta, yellow, black, and light black. The point $Z(l, c)$ represents a coordinate point of the input Lab color values. The maximum color saturation point R in this color phase is defined by the maximum M and the maximum Y (M=Y=max). Symbol W represents the maximum point of color brightness or the brightest point in the gamut, and symbol Bk is the minimum point of color brightness in the gamut. In a precise sense, the points W and Bk are not located on the achromatic color axis, but are located near the achromatic color axis. For convenience sake, it is desirable to set W and Bk on the achromatic color axis using a known technique, such as, rendering a* value and b* value zero. Now, consideration is made of the W-Bk line, the R-Bk line, and the X-Bk line, where X denotes the intersection of the line connecting Bk and the input color value Z with the W-R line.

First, four points are defined in the color phase of FIG. 5 in order to regulate the L output value. That is, two black starting points A and B (A, B) located on the W-Bk line and the R-Bk line, respectively, and two black saturation points C and D (C, D) on the W-Bk line and the R-Bk line, respectively. The parameters A, B, C, and D have values representing the distances from point Bk, on condition that the lengths of the W-Bk line, the R-Bk line, and the X-Bk line are "1". Then, based on the A, B, C, and D values, a black starting point P and a black saturation point Q are determined along the X-Bk line on which the input color value $Z(l, c)$ is located. For example, point P may be determined as an intersection of the X-Bk line with the A-B line. A black output signal corresponding to the input color value $Z(l, c)$ is determined by linearly interpolating the range from the black starting point P to the black saturation point Q.

Although explanation is made above using the R phase as an example, the same process applies to the rest of the six (CMYRGB) color phases to set the black starting point and the black saturation point in each phase.

For the space between these color phases, Bk output signals can be determined by interpolation using the parameters of the black starting points and the black saturation points of two adjacent color phases. The number of color phases may be increased, instead of using six color phases.

If six color phases are used, a black starting point and a black saturation point are set on each of the W-Bk line, C-Bk line, M-Bk line, Y-Bk line, R-Bk line, G-Bk line, and B-Bk line, and therefore, black-version generation can be regulated finely for each of the color phases. In this manner, minute and precise black control can be realized, as compared with a conventional black version generation of the UCR scheme. Consequently, color reproduction satisfying simultaneously demands for less ink consumption and higher image quality can be realized.

Returning to FIG. 3, the process proceeds to step S202, in which a light black output level Lk is calculated using the LabK to Lk mapping function. In step S203, a CMY output signal set is calculated for the input set of Lab color values, based on the Lab to CMY mapping function.

By performing steps S201 through S203, a set of output signals of cyan, magenta, yellow, black, and light black (CMYBLk) is determined. The calculated signal set may be output as it is; however, the output color components may be offset from the input color value in the actual process, due to the precision of the color conversion of the neural network. To overcome this problem, the Lab values are predicted again from the calculated values of the CMYKLk signal set, using the CMYKLk to Lab mapping function in step S204. The color difference between the calculated CMYLKk signal and the input signal represented by the Lab values is compared with a prescribed value to determine whether the color difference is within the prescribed range in step S205. If the deviation from the input Lab values is greater than the prescribed range (NO in S205), the output CMYKLk signal is corrected in step S206. Since the input color signal is a three-dimensional signal expressed by three color components, three of the output signal components have to be corrected. Then, the C, M, and Y levels of the output signal are corrected such that a CMYKLk output signal is calorimetrically consistent with the input color value. Using this type of converging operation can realize highly precise color conversion because error estimation is carried out in the uniform color space. Examples of the convergence algorithm performed in step S206 include, for example, a so-called Newton's method.

In place of the CMY components of the calculated output signal, other combinations, for example, light black (Lk), cyan (c) and yellow (Y) levels, mat be corrected. However, the converging operation is likely to be instable, and is often unsuitable to numerical computation.

Through the above-described color signal conversion, a color signal set that is calorimetrically consistent with an input Lab signal and satisfies the maximum black condition can be obtained.

Example 2

Although in Example 1 a light black output level Lk is estimated from black output level K, a black output level K may be estimated from light black output level Lk. In this case, a LabLk to K mapping function, a Lab to CMY mapping function, and a CMYKLk to Lab mapping functions are determined. These mapping functions are determined by establishing a neural network using the colorimetric data of the color samples satisfying the maximum black condition, as in Example 1. When converting the input Lab signal, a light black output signal Lk is determined first, according to a Lk-version generating parameter. The light black output signal Lk can be generated by setting the starting point and the saturation point of the light black ink along the achromatic color axis in each of the basic six color phases, as in the black generation described in Example 1.

Then, a black ink output level K is calculated using the established LabLk to K mapping function. Then, the CMY output signal is calculated with respect to the input color signal (Lab values), using the Lab to CMY mapping function. Then, the CMY output signal is corrected so as to minimize the color difference from the input Lab values by converging operation, as in Example 1.

Example 3

In Example 3, the black generating function is optimized based on the image quality evaluation. In Examples 1 and 2, a black output level K or a light black output level Lk is determined using a predetermined mapping function. However, in order to fully take advantage of the light black characteristic, black and light black generating functions should be optimized taking the granularity and/or ink consumption into account. Accordingly, optimization of the black generating function based on image quality evaluation is explained below.

When generating a CMYKLk output signal from Lab values, the output CMYLKk levels are determined by considering not only colorimetric agreement, but also image quality and ink consumption. For a highlight area in which granularity is noticeable, use of black ink is reduced as much as possible. In contrast, for a shadow area in which granularity is not noticeable, black ink is used so as to reduce the total amount of ink consumption. For example, using the chart shown in FIG. 5, the black starting point is set closer to the shadow end for Y-phase or an achromatic color phase, while the black starting point is set closer to the maximum saturation for B-phase. However, since the granularity varies among image reproducing apparatuses, the optimization process should be conducted for each apparatus. For this reason, in Example 3, optimization of the black generating parameter is performed based on the comprehensive evaluation scheme.

(Overview of Optimization)

Figure 6:
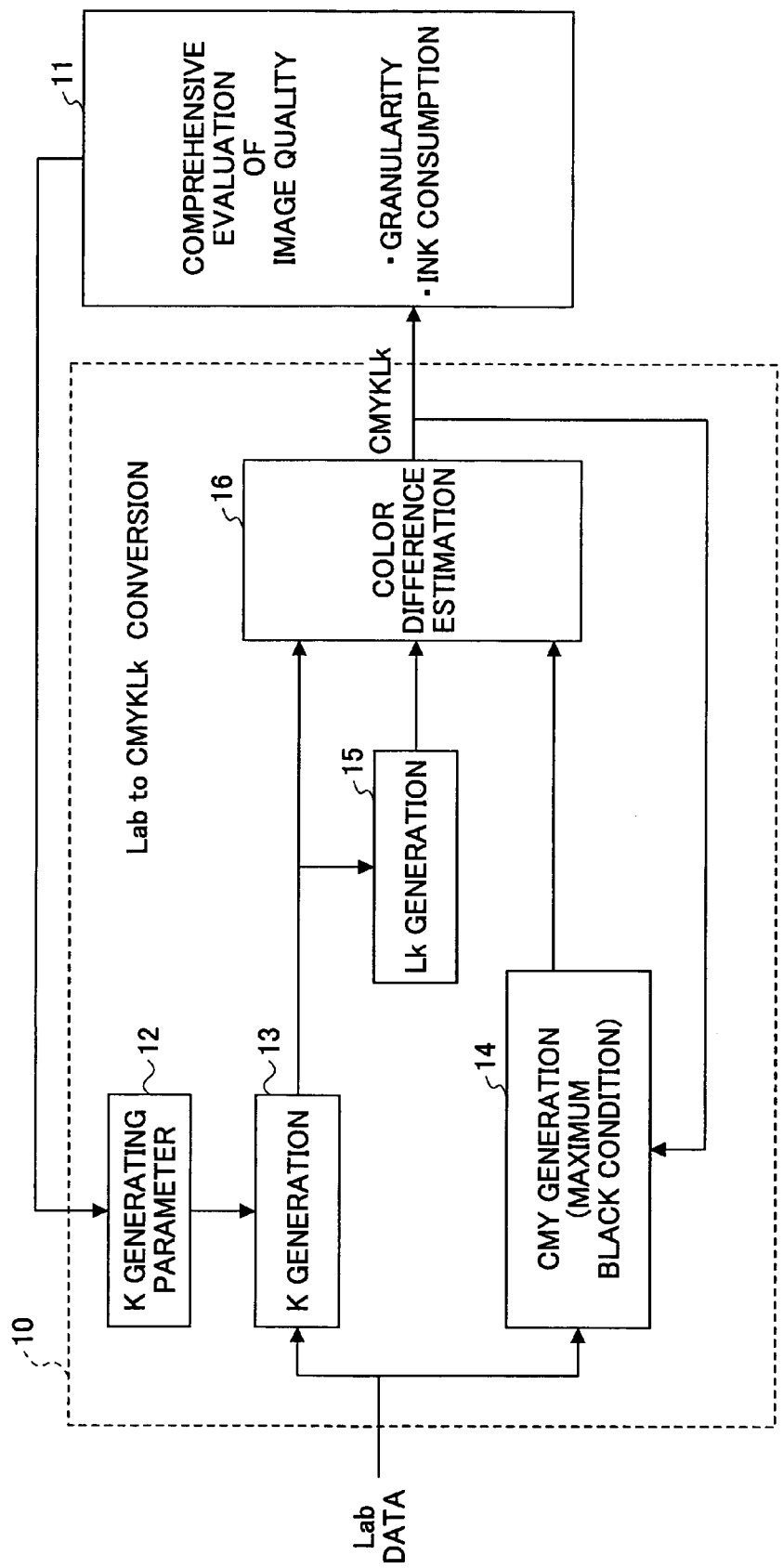
FIG. 6 is a block diagram of a color signal converting unit to perform optimization of black version generating parameters.

FIG. 6 is a schematic diagram of a functional block implementing the optimization process. The block 10 enclosed by the dashed line is a color signal processing module, which corresponds to the color signal conversion means 2 shown in FIG. 1 and explained in conjunction with Example 1. In FIG. 6, a number of Lab color value sets are converted to CMYKLk signal sets by the above-described color signal conversion technique. Then, based on the generated CMYKLk signal sets, ink consumption and granularity are comprehensively evaluated by a comprehensive image quality evaluation unit 11. The K generating parameter 12 is corrected such that the evaluation result is improved. This process is repeated until the K generating parameter 12 is optimized. If using the black generation method described in Example 1, the total of fourteen (14) parameters are optimized because the black starting point and the black saturation point are set for the achromatic axis and six basic color phases.

This process is generally referred to as an optimization problem. There are a variety of optimization methods, including simulated annealing method, genetic algorithm (GA), and Powell's method, and any of these methods may be employed.

If the K generating parameter is modified during the optimization process, all of the CMYKLk levels may be calculated again, as illustrated in FIG. 6. However, since the CMY levels are fixed with respect to the input Lab values under the maximum black condition, the recalculation may be performed solely for the K output signal and Lk output signal, for the purpose of speeding up the optimization process.

In addition, a constraint condition may be imposed on a predetermined parameter for the optimization process. For example, in a strict sense, the color expressed by black ink does not accurately satisfy the condition of a=b=0, but is slightly offset from the achromatic color axis. However, taking the metamerism characteristic into account, it is preferable to reproduce an achromatic color using only black ink and light black ink. Therefore, the CMY values on the achromatic color axis are fixed to zero in advance, and only K and Lk are optimized. This arrangement can prevent chromatic inks from mixing into achromatic inks.

(Comprehensive Evaluation)

Figure 7:
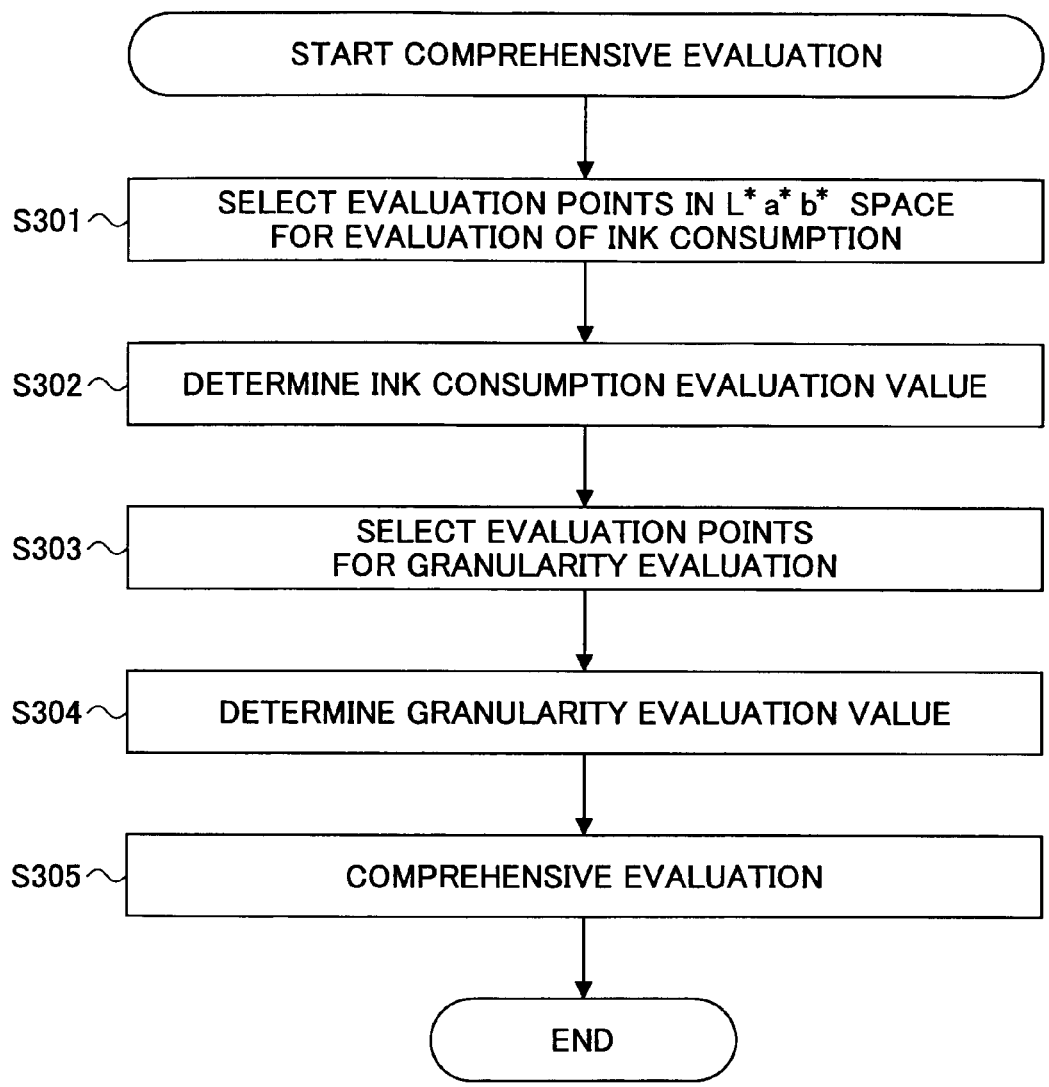
FIG. 7 is a flowchart of total evaluation performed for optimizing the black version generating parameters.

FIG. 7 is a flowchart of the comprehensive evaluation. In Example 3, the comprehensive image quality evaluation unit 11 estimates two evaluation values for ink consumption and granularity, and a overall estimation value is estimated based on these individual evaluation values. First, in step S301, multiple points are selected in the L*a*b* space for evaluation of ink consumption. Each evaluation point is represented by a set of Lab values. Then, in step S302, the total amount of ink consumption required to reproduce the colors of the selected points is calculated, and an evaluation value is determined. In step S303, evaluation points for granularity evaluation are selected. In step S304, a granularity evaluation value is determined. In step S305, a comprehensive evaluation value is determined based on the ink consumption evaluation value and the granularity evaluation value. The evaluation points selected for evaluation of ink consumption in the uniform color space (e.g., L*a*b* space) may be different from or equal to the evaluation points of the granularity evaluation.

Evaluation of Ink Consumption

Figure 8:
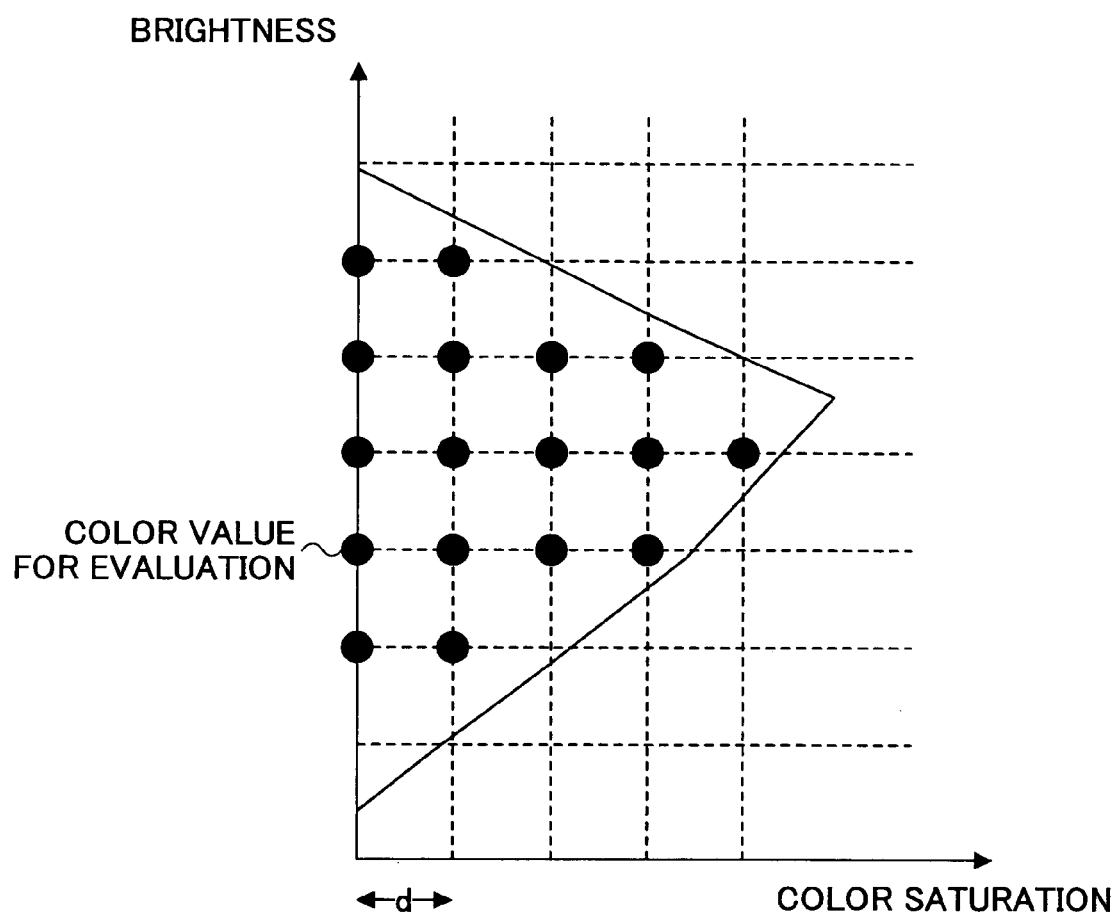
FIG. 8 is a chart plotting color values for evaluation of ink consumption.

First in step S301, multiple sets of Lab values are selected for evaluating ink consumption. Ink consumption differs depending on the input image; however, performing optimization every time an image is input is unrealistic because the optimization process takes time. In this example, an average amount of ink consumption is determined by using a number of input color values obtained at a number of evaluation points uniformly distributing over the L*a*b* space. If color values residing out of the color range of a printer are contained in the evaluation, an extra process for color range compression is required and the process becomes complicated. Accordingly, only those color values residing in the color range of the printer are used, as illustrated in FIG. 8.

To be more precise, lattice points aligning at interval "d" in the Lab color space are defined, and determination is made for each lattice point whether the lattice point is located within the color range of the printer. The Lab values at each of the lattice points located within the color range are stored as a color value for evaluation. The appropriateness of the locations of the lattice points can be determined by performing signal conversion using the Lab to CMY mapping function and by examining whether the CMY values take appropriate values. The selected sets of the color values for evaluation (evaluation color values) are stored in the memory so as to repeatedly be read from the memory during the optimization process.

(Calculation of Evaluation Value for Ink Consumption)

Next, in step S302, an ink consumption evaluation value is calculated using the sets of color values for evaluation selected in step S301. The Lab to CMYKLk conversion described in Example 1 is performed on each of the evaluation color values to acquire an associated set of CMYKLk output levels. At the beginning of the optimization process, an initial parameter is used as the K generating parameter. As an example of the initial parameter, the black staring point is set to 1.0 in all the color phases, and the black saturation point is set to 0.0 in all the color phases.

When the CMYKLk output signal is estimated, the values of the respective components (C, M, Y, K, and Lk) are summed up to obtain the ink consumption at that estimation point. The ink consumption Tz for a certain color value z is expressed as $$Tz = C + M + Y + K + Lk.$$

In this equation, it is assumed that each of the output levels of C, M, Y, K, and Lk is in proportion to the associated ink consumption. In order to evaluate more precisely, it is preferable to measure the relation between each of the output levels of C, M, Y, K, and Lk and the associated ink consumption, and to create a lookup table for allowing conversion to an actual amount of ink consumption. The ink consumption amounts of the respective color values (or the evaluation points) are summed up to obtain the ink consumption evaluation value.

Evaluation of Granularity

Next, granularity is evaluated in steps S303 and S304. Granularity varies depending on combinations of C, M, Y, and K even for the same input color. For example, the granularity of a highlight gray image reproduced using only black ink is greatly different from that reproduced using C, M and Y. In general, not using K leads to satisfactory granularity.

Figure 9:
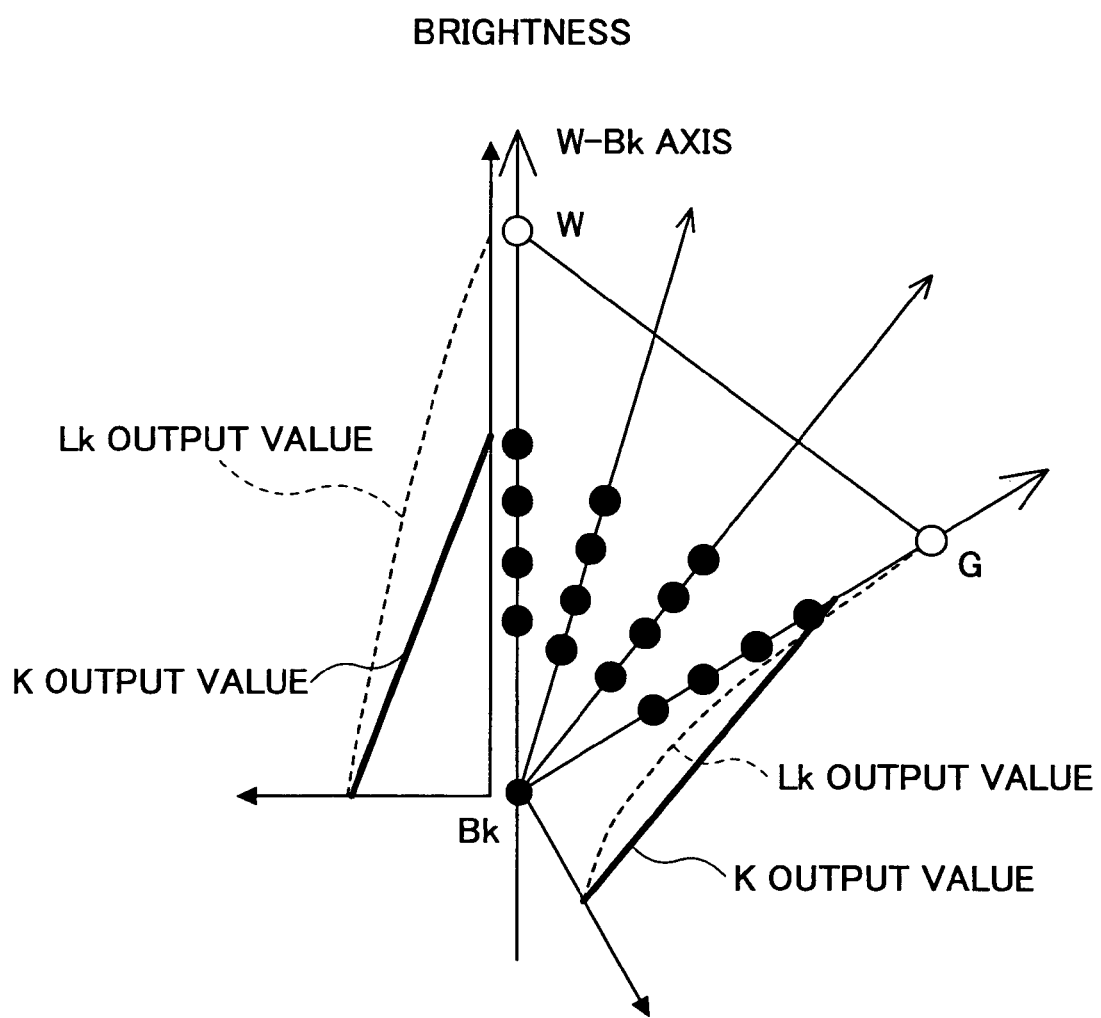
FIG. 9 is a chart plotting color values for evaluation of granularity.

Granularity is likely to become large near the black ink starting point. Accordingly, the color values for evaluation are determined based on black output levels, with reference to the points of, for example, 1%, 10%, 20%, and 30%. An example of evaluation color value is explained in conjunction with FIG. 9. FIG. 9 is a chart showing evaluation color values in green phase. The bold lines represent black output levels along the W-Bk line and the G-Bk lines, respectively. Along the bold line, black output levels of 1%, 10%, 20%, and 30% are evaluated. Using only the W-Bk line and the G-Bk line may cause a biased evaluation result, and therefore, multiple lines are inserted between the W-Bk line and the G-Bk line to evaluate at multiple points (at 1%, 10%, 20%, and 30%). Similarly, evaluation points are set in other color phases. This method is only an example, and the black output levels for granularity evaluation are not limited to the example of 1%, 10%, 20%, and 30%.

(Calculation of Granularity Evaluation Value)

The comprehensive image quality evaluation unit 11 determines granularity of each of the C, M, Y, K, and Lk, and calculates an average of these granularities to use the average as a granularity evaluation value. Alternatively, the worst value or a variance may be used. One method for determining the granularity from CMYKLk is outputting color samples of all the combinations of C, M, Y, K, and Lk (in an ideal sense), and measuring the granularity of each color sample using a known technique, such as a method disclosed in Imagawa et al., "Noise Evaluation Method for Halftone Image", Hardcopy ' 96, Collected Papers, at 189-192, 1996. The relation between each of the CMYKLk combinations and the associated granularity is then recorded. However, this method is unrealistic because of a huge number of color samples. Accordingly, it is proposed to create a five-dimensional lookup table based on granularity measurement performed on only a part of the combinations. When an unselected combination is input, the associated granularity is determined by memory map interpolation. However, this method still requires great labor for granularity measurement because of a large number of lattice points in the five-dimensional lookup table.

In contrast, embodiments of the present invention can reduce the number of color samples to be measured because of the maximum black condition. For example, if a five-dimensional lookup table is created by dividing each of C, M, Y, K, and Lk levels by eight, granularity has to be measured for 59049 ($9^5$=59049) color samples. However, under the maximum black condition, the output level of one of the CMY components is zero, and therefore, three lookup tables required for the respective cases of Y=0, C=0, and M=0. Since three four-dimensional lookup table are required, granularity measurement is conducted for 19683 ($3*9^4$=19683) color samples. The number of color samples can be reduced to one third. When determining the granularity from a CMYKLk signal in the optimization process, it is determined which color component has a zero output level, and the lookup table to be used is switched based on the determination result. This method can achieve the same precision as using a five-dimensional lookup table.

Comprehensive Evaluation

The comprehensive image quality evaluation unit 11 estimates a comprehensive evaluation value based on the ink consumption evaluation value and the granularity evaluation value. First, both the ink consumption evaluation value and the granularity evaluation value are normalized. In normalization of ink consumption evaluation value, the evaluation value of ink consumption using the maximum amount of black ink is normalized to "1".

For the granularity evaluation value, there is no specific value particularly suitable for normalization, and therefore, an arbitrary value is used appropriately. This normalization is not necessarily strict, and is performed so as to keep the evaluation values ranging from 0 to 1, by appropriately giving a black generating parameter and checking the distribution of the granularity evaluation values.

By rendering multiple evaluation scales substantially consistent with each other, the comprehensive evaluation values can be handled easily. If a greater value indicates a better condition in both the ink consumption evaluation value and the granularity evaluation value, then the comprehensive evaluation value (CEV) is expressed as a linear sum of these two evaluation values using positive coefficients $\alpha$ and $\beta$.

$$CEV=\alpha*(\text{ink consumption evaluation value})+\beta*(\text{granularity evaluation value})$$

The black generating parameter is determined by optimization so as to maximize the comprehensive evaluation value. The coefficients $\alpha$ and $\beta$ are adjusted appropriately depending on demand for reducing ink consumption or emphasis of image quality. In this way, the optimum color correcting parameter can be determined taking the ink consumption and granularity into account.

Example 4

Example 4 is directed to a color signal processing apparatus using a color profile. In the previous examples, a CMYKLk output signal is determined for each input color value. However, in the previously described examples, the optimization process for optimizing the black generating parameter takes time, and is unsuitable to real-time operations. Accordingly, it is desirable for use a color profile created in advance by the method described above when actually outputting a color image from a printer or other image reproducing apparatuses. In this case, multi-dimensional memory map interpolation is performed to convert an input color signal to an output signal.

Figure 10:
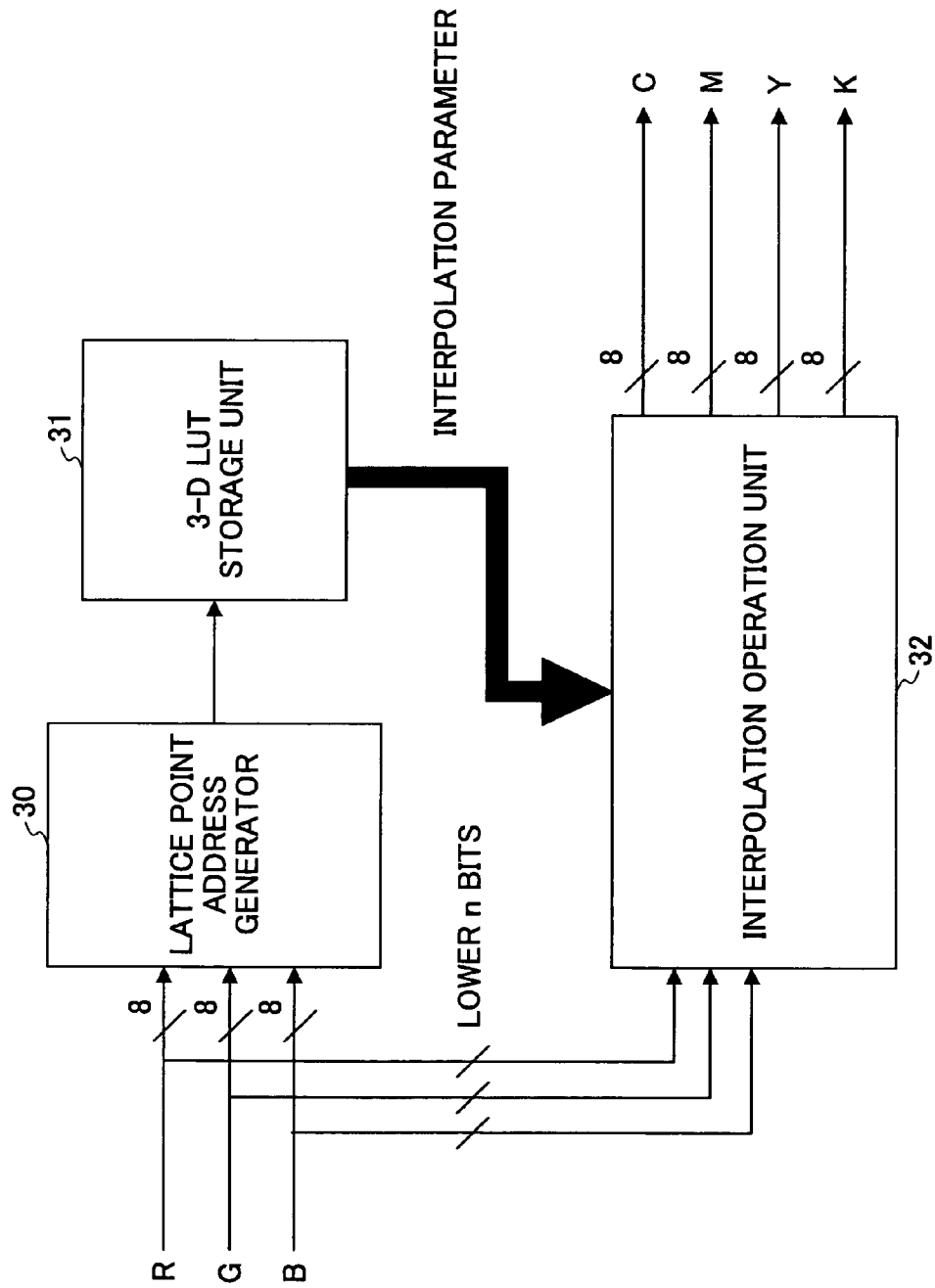
FIG. 10 is a schematic block diagram of a memory map interpolating device.

FIG. 10 is a schematic block diagram of a color signal processing apparatus for performing color conversion. In the example shown in FIG. 10, color conversion is performed using memory map interpolation. This signal processing apparatus includes a 3-dimensional lookup table (3D-LUT) 31 defining a color conversion profile, an interpolation operation unit 32, and a lattice point address generator 30. The interpolation operation unit 32 and the lattice point address generator 30 structure a color conversion processing unit.

In memory map interpolation, a three-dimensional space of interpolation in which the input color data are contained is selected using a higher-order bit and a lower-order bit of the input color data, and the output level at the apex (lattice point) of the three-dimensional space is read from the 3D-LUT 31. Then, interpolation is performed using the lattice point output level read from the 3D-LUT 31 and the lower-order bit of the input color data to estimate an output level corresponding to the input color data.

The 3D-LUT 31 converts the RGB color signal at the lattice point to a Lab signal, and estimates a CMYKLk signal using the above-described method. The estimated CMYKLk signal is used as an interpolation parameter. If the input RGB signal does not reside in the color range of the printer, a suitable CMYKLk output cannot be obtained. In this case, a gamut process is conducted to convert the Lab values out of the color range to Lab values within the color range.

Determination as to whether the Lab values reside in the gamut (i.e., the reproducible color range) can be implemented by checking the underflow or the overflow of the CMY values.

Example 5

Figure 11:
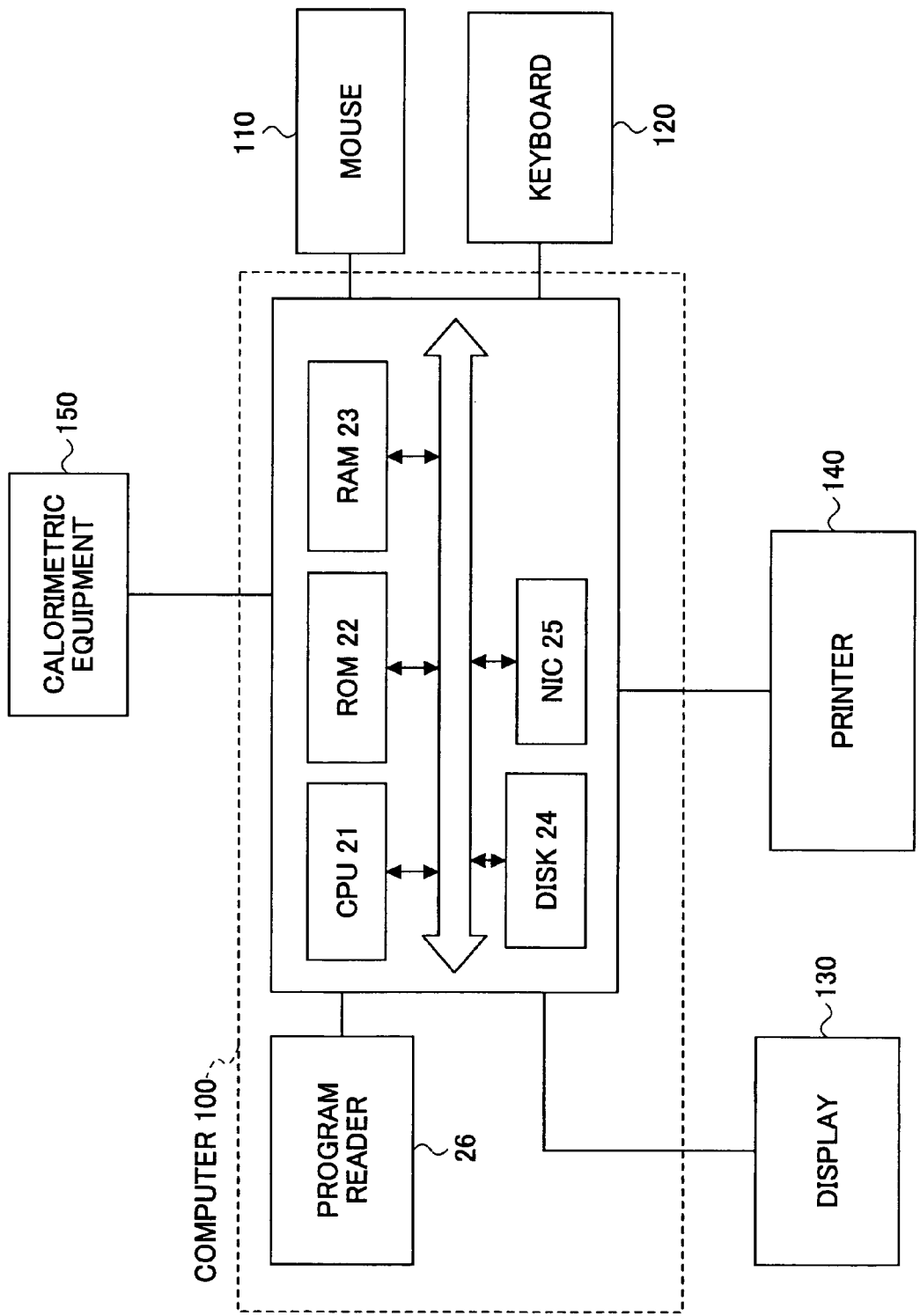
FIG. 11 is a functional block diagram implementing the present invention by software.

FIG. 11 is a functional block diagram implementing the color signal processing method according to an embodiment of the invention. The color signal processing apparatus is structured by a computer 100 including a main body, calorimetric equipment 150 for reading the color value of each patch of the color chart, an input device including a mouse 110 and a keyboard 120 for inputting data and commands, a display 130 for displaying image data, and an image reproducing apparatus 140, such as a color printer.

The calorimetric equipment 150 measures a color and outputs the numerical representation of the color. In the colorimetric equipment 150, an object (e.g., a sheet of paper bearing an image) is illuminated by light, and the intensity of the light reflected from or transmitted through the object is measured using a light to electric conversion technique. To this end, the colorimetric equipment 150 basically includes a light source and a photometer.

The main body includes a CPU 21, a ROM 22 storing control programs for the CPU 21, a RAM 23, a hard disk drive 24, and an NIC 25 for transmitting and receiving data to and from other equipment or devices. These components are mutually connected via bus so as to allow data and commands to be input and output.

The CPU 21 may have a function for implementing the color signal processing method and the color conversion profile creating method according to an embodiment of the invention. Such a function may be realized by a software package, residing on such as a CD-ROM or another information recording media.

In other words, the color signal processing method and the color conversion profile creating method can be implemented by installing a program from an information recording medium (such as a CD-ROM) in a general-purpose computer system furnished with an image scanner, a display, or other devices, and by causing the microprocessor of the computer system to execute the program. In this case, the program used in the hardware system to execute the color signal processing method and the color conversion profile creating method may be provided as a form of an information recording medium. Examples of the information recording medium include ROMs, RAMs, flexible diskettes, memory cards, other than CD-ROMs. The program recorded in the information recording medium is installed in a memory device, such as a hard disk drive 24, assembled in the hardware system, and is executed to implement color signal processing and color conversion profile creation.

The program for implementing the color signal processing method and the color conversion profile creating method may be provided from a server through a transmission line or channel, instead of provided by a recording medium.

As has been described above, a color signal processing method used in a high image quality five-color printer using black and light black and with less ink consumption is provided.

When color value information (Lab values) in a uniform color space (Lab color space) is converted to five output levels (CMYKLk) including a black level and a light black level, precise color conversion is performed such that the output color is colorimetrically consistent with the input color data.

The output levels of black and light black are determined so as to maintain the prescribed relation with respect to the input color values.

The output levels of black and light black are generated from the color value information in the uniform color space so as to satisfy the maximum black condition.

The output levels of chromatic colors (CMY) are also generated from the color value information in the uniform color space so as to satisfy the maximum black condition.

The color value information can be converted to a CMYKLk output signal that is calorimetrically consistent with the color value information and can simultaneously satisfy the image quality and ink consumption requirement.

When optimizing the black generating parameter, the granularity can be predicted with less workload.

The color signal processing method is superior in gray stability.

The optimization of the black generating parameter can be performed at high speed.

A color profile is created to accurately convert the input color signal to five output levels, including a light black level, so as to be calorimetrically consistent with the input color signal.

A color signal processing apparatus, a color signal processing program, and a recording medium storing the program are also provided, which apparatus and program realize a high image quality five-color print with less ink consumption.

With the above-described color signal processing method, the output levels of black and light black are determined such that the color reproduced by the output signal is calorimetrically consistent with the input color value, and that the total output level of the three chromatic colors becomes the minimum. Accordingly, the ink consumption can be reduced in a five-color printer.

The output level of black is determined from the input color value, then the output level of light black is determined based on the black output level and the input color value, and then the output levels of the chromatic colors are determined so as to be calorimetrically consistent with the input color values. Consequently, the input color value represented in the uniform color space can be converted accurately to an output signal of black, light black, and three chromatic colors.

The same applies to the configuration in which the light black output is first determined from the input color value.

A number of color samples obtained by changing the output levels of the five color components are output, and the colorimetric measurement is performed on at least a part of the color samples to acquire the input color value information. Then, a mapping function for generating a light black output level from the input color value and the black output level is created. Consequently, color signal conversion can be performed while maintaining the appropriate relation between the color value information represented in the uniform color space and the output color levels.

When the output level of light black is first determined from the input color value, a mapping function for generating a black output level from the input color value and the light black output level is created. This arrangement can achieve the same effect.

The mapping function is created using color samples with one of the three chromatic colors having an output level of zero, and accordingly, the black output level and the light black output level can be generated so as to satisfy the maximum black condition.

A mapping function for converting the color value information to the output levels of the chromatic color components is also created, using a color sample with one of the chromatic color components having a zero output level, and accordingly, the output signal of the chromatic color components can be generated so as to satisfy the maximum black condition.

Multiple sets of five output levels, each including a black level and a light black level, are determined at multiple evaluation points in the uniform color space, and at least ink consumption and granularity are evaluated based on the sets of output levels. Then, the output levels of black and light black are nonlinearly optimized based on the evaluation result. Consequently, a high image quality color printer using a light black ink can be realized with less ink consumption.

The granularity is calculated using a four-dimensional lookup table having four inputs, that is, two of the three chromatic colors, black, and light black. Accordingly, the number of color samples used in granularity measurement is reduced.

A constraint may be imposed on the optimization, such that a color value on the achromatic color axis is reproduced using only black and light black. Consequently, a color printer using a light black ink, which is superior in gray stability, is provided.

In the nonlinear optimization, the output levels of only black and light black are recalculated, and the operation speed of the optimization process can be improved.

This patent application is based on and claims the benefit of the earlier filing date of Japanese Patent Application No. 2003-412875 filed Dec. 11, 2003, the entire contents of which are hereby incorporated by reference.

The invention claimed is:

1. A signal processing method for converting color value information represented in a uniform color space into a set of five output color levels of black, light black, and three chromatic colors, the method comprising:

determining a black output level based on the color value information;

determining a light black output level based on the black output level and the color value information;

determining output levels of the three chromatic colors such that the determined output levels are colorimetrically consistent with the color value information;

acquiring a plurality of the sets of the five output color levels of the five color components for a plurality of the color values;

evaluating at least ink consumption and granularity of a reproduced image based on the acquired sets of the five output color levels; and performing nonlinear optimization for optimizing the black output level based on the evaluation result.

2. The signal processing method of claim 1, further comprising:

outputting a plurality of color samples by varying the five output color levels;

performing calorimetric measurement on the color samples to acquire the color value information represented in the uniform color space;

creating a mapping function for converting a combination of the color value information and the black output level into the light black output level; and determining the light black output level using the mapping function.

3. The color signal processing method of claim 2, wherein the mapping function is created to satisfy a maximum black condition with a zero output level in one of the three chromatic colors.

4. The signal processing method of claim 1, further comprising:

creating a mapping function for converting the color value information to the output color levels of the three chromatic colors, using a color sample reproduced from the set of the output color levels with one of the chromatic colors having a zero level, to satisfy a maximum black condition.

5. The signal processing method of claim 1, wherein the granularity is evaluated using a four-dimensional lookup table having four inputs of two of the three chromatic color output levels, the black output level, and the light black output level.

6. The signal processing method of claim 1, further comprising:

adding a constraint to reproduce the color values located on an achromatic color axis using only the black component and the light black component.

7. The signal processing method of claim 1, wherein the nonlinear optimization includes recalculation of the output levels of only the black component and the light black component.

8. A signal processing method for converting color value information represented in a uniform color space into a set of five output color levels of black, light black, and three chromatic colors, the method comprising:

determining a light black output level based on the color value information;

determining a black output level based on the light black output level and the color value information;

determining output levels of the three chromatic colors such that the determined output levels are calorimetrically consistent with the color value information;

acquiring a plurality of the sets of the five output levels of the five color components for a plurality of color values;

evaluating at least ink consumption and granularity of a reproduced image based on the acquired sets of the five output color levels; and performing nonlinear optimization for optimizing the light black output level based on the evaluation result.

9. The signal processing method of claim 8, further comprising:

outputting a plurality of color samples by varying the five output color levels;

performing colorimetric measurement on the color samples to acquire the color value information represented in the uniform color space;

creating a mapping function for converting a combination of the color value information and the light black output level into the black output level; and determining the black output level using the mapping function.

10. The color signal processing method of claim 9, wherein the mapping function is created to satisfy a maximum black condition with a zero output level in one of the three chromatic colors.

11. The signal processing method of claim 8, further comprising:

creating a mapping function for converting the color value information to the output color levels of the chromatic colors, using a color sample having a zero output level in one of the chromatic colors, to satisfy a maximum black condition.

12. The signal processing method of claim 8, wherein the granularity is evaluated using a four-dimensional lookup table having four inputs of two of the three chromatic color output levels, the black output level, and the light black output level.

13. The signal processing method of claim 8, further comprising:

adding a constraint so as to reproduce the color values located on an achromatic color axis by only the black component and the light black component.

14. The signal processing method of claim 8, wherein the nonlinear optimization includes recalculation of the output levels of only the black component and the light black component.

* * * * *